United States Patent
Ise et al.

(10) Patent No.: US 8,565,165 B2
(45) Date of Patent: Oct. 22, 2013

(54) WIRELESS TERMINAL DEVICE, COMMUNICATION METHOD, AND COMPUTER-READABLE RECORDING MEDIUM

(75) Inventors: Kotaro Ise, Saitama (JP); Yasuyuki Tanaka, Kawasaki (JP); Kiyoshi Toshimitsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 908 days.

(21) Appl. No.: 12/407,284

(22) Filed: Mar. 19, 2009

(65) Prior Publication Data

US 2010/0124213 A1   May 20, 2010

(30) Foreign Application Priority Data

Nov. 17, 2008   (JP) ................................. 2008-293415

(51) Int. Cl.
*H04W 4/00* (2009.01)
(52) U.S. Cl.
USPC ............................ 370/329; 370/338; 370/341
(58) Field of Classification Search
None
See application file for complete search history.

(56) References Cited

U.S. PATENT DOCUMENTS

| | | | | |
|---|---|---|---|---|
| 2004/0001467 | A1* | 1/2004 | Cromer et al. | 370/338 |
| 2005/0197136 | A1* | 9/2005 | Friday et al. | 455/456.1 |
| 2006/0035636 | A1* | 2/2006 | Pirila | 455/435.2 |
| 2006/0142004 | A1* | 6/2006 | He et al. | 455/434 |
| 2007/0184835 | A1* | 8/2007 | Bitran et al. | 455/434 |
| 2008/0052754 | A1* | 2/2008 | Iga | 726/1 |
| 2008/0219208 | A1* | 9/2008 | Adams et al. | 370/328 |
| 2009/0111466 | A1* | 4/2009 | Montemurro et al. | 455/434 |
| 2009/0252137 | A1* | 10/2009 | Bitran et al. | 370/338 |
| 2010/0008285 | A1* | 1/2010 | Kuroda | 370/315 |
| 2010/0267380 | A2* | 10/2010 | Montemurro et al. | 455/434 |

FOREIGN PATENT DOCUMENTS

| | | |
|---|---|---|
| JP | 2004-88592 | 3/2004 |
| JP | 2006-33251 | 2/2006 |
| JP | 2007-134748 | 5/2007 |
| JP | 2008-148136 | 6/2008 |
| WO | WO 2008/008987 A2 | 1/2008 |

OTHER PUBLICATIONS

Notification of Reason for Rejection issued by the Japanese Patent Office on Aug. 28, 2012, for Japanese Patent Application No. 2008-293415, and English-language translation thereof.

* cited by examiner

*Primary Examiner* — Chi Pham
*Assistant Examiner* — Soon-Dong D Hyun
(74) *Attorney, Agent, or Firm* — Finnegan, Henderson, Farabow, Garrett & Dunner, L.L.P.

(57) ABSTRACT

A wireless terminal device performs first, second, and third scans in sequence to detect wireless access points; stores base station information on the detected wireless access points in a storing unit; sets a disappearance flag in base station information that correspond to a wireless access point that was detected in the first scan and not in the second scan; sets a reappearance flag in base station information that correspond to a wireless access point that was not detected in the second scan and was detected in the third scan; identifies a wireless base station corresponding to base station information in which the disappearance flag and the reappearance flag are set; and displays information on the wireless base station identified on a display unit.

12 Claims, 8 Drawing Sheets

FIG. 3

| | | | |
|---|---|---|---|
| TIMESTAMP | 111111111 | 22222 | 333333 |
| BEACON INTERVAL | 100msec | 100msec | 100msec |
| CAPABILITY INFORMATION | ENCRYPTION CAPABLE | ENCRYPTION NOT CAPABLE | ENCRYPTION CAPABLE |
| SSID | TSB1122 | TSB3344 | TSB8899 |
| SUPPORTED RATE | 1,2,5.5,11 | 1,2,5.5,11, 6,9,12,18,24,36,48,54 | 1,2,5.5,11, 6,8,12,18,24,36,48,54 |
| BSSID | 00-12-F0-EA-F7-FC | 00-12-F0-EA-F7-F0 | 00-12-F0-EA-F7-FA |
| CH | 1 | 5 | 9 |
| BEACON RECEPTION TIME | 10000 | 10001 | 10050 |
| PROBE RESPONSE RECEPTION TIME | 9998 | 10002 | |
| WIRELESS ACCESS POINT INFORMATION SOURCE | BEACON | PROBE RESPONSE | BEACON |
| WIRELESS ACCESS POINT INFORMATION LIFETIME | 20000 | 20002 | 20050 |
| WIRELESS ACCESS POINT DISAPPEARANCE FLAG | 0 | 0 | 0 |
| WIRELESS ACCESS POINT REAPPEARANCE FLAG | 0 | 0 | 0 |

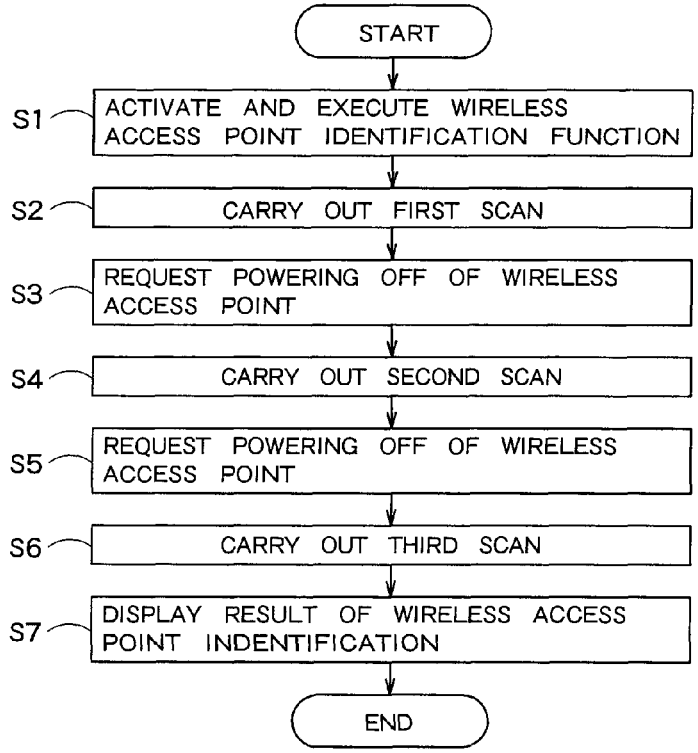
F I G. 4
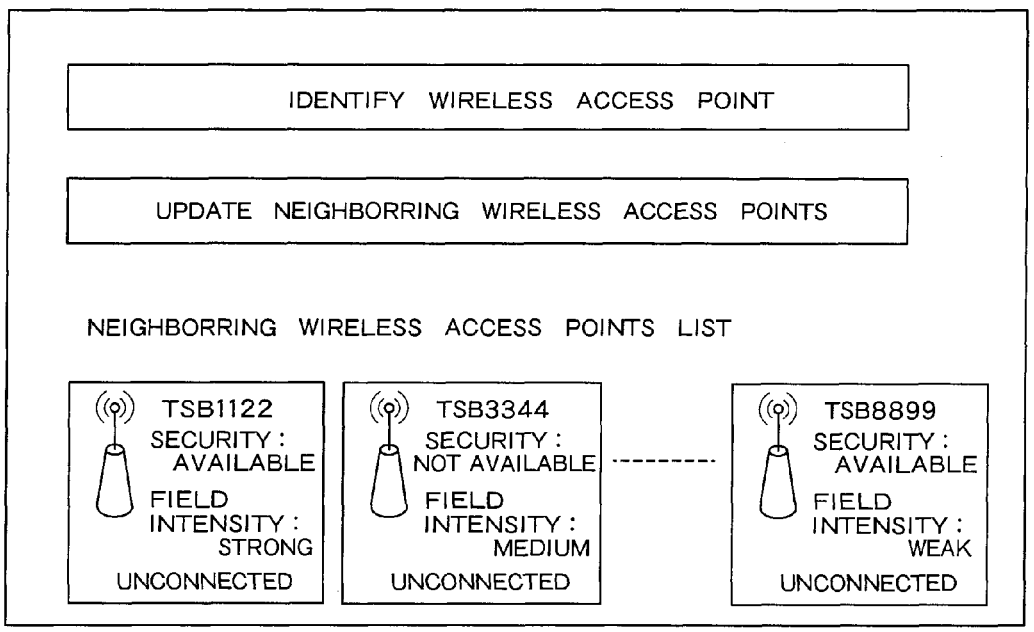
F I G. 5

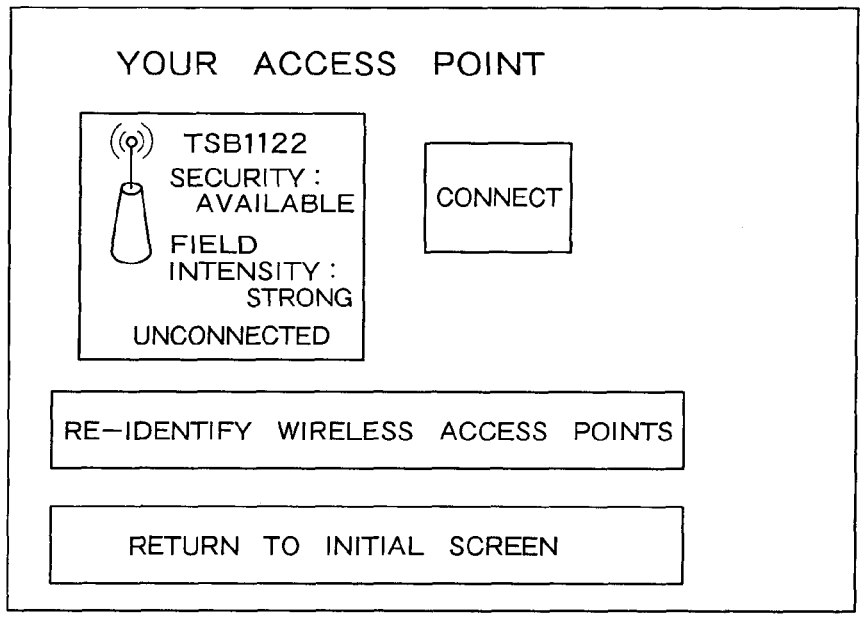
F I G. 6
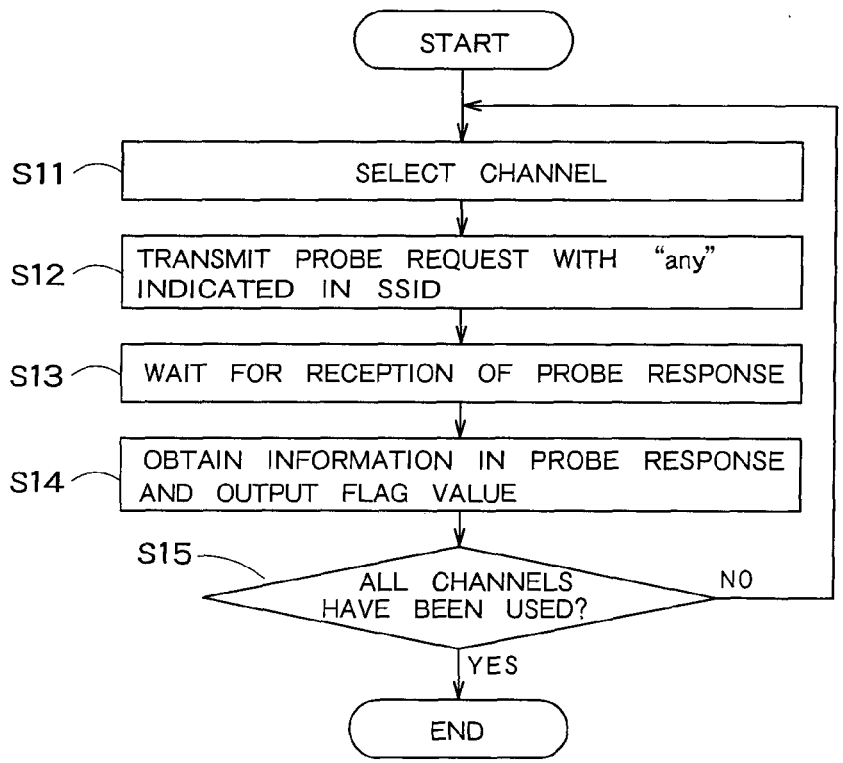
F I G. 7

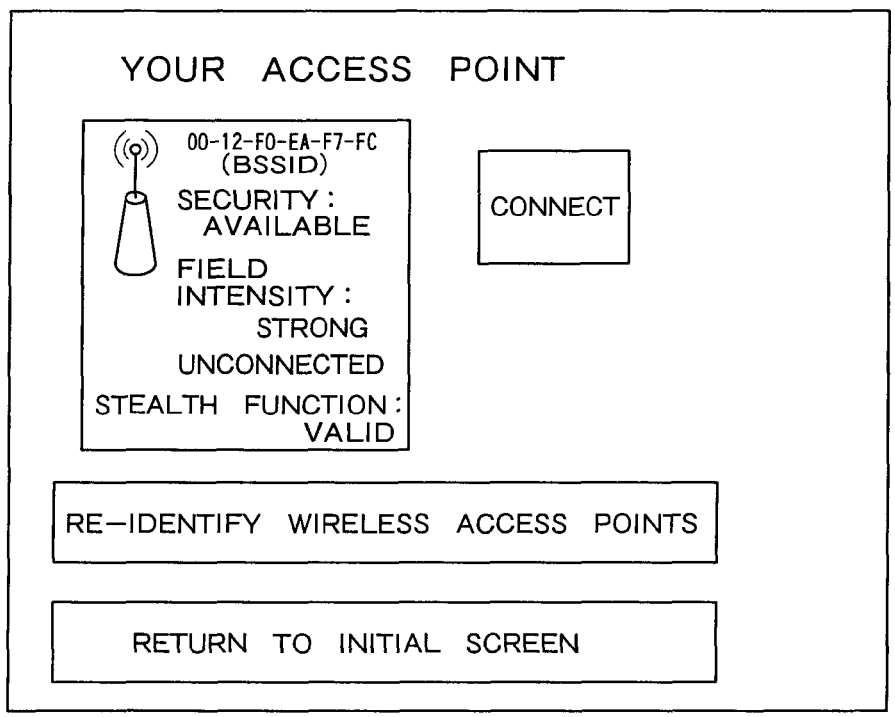
F I G. 11
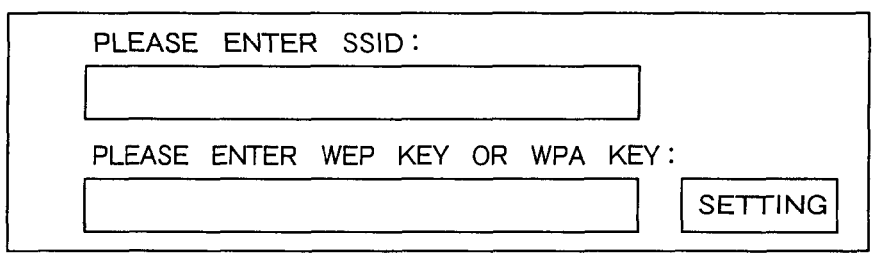
F I G. 12

WIRELESS TERMINAL DEVICE, COMMUNICATION METHOD, AND COMPUTER-READABLE RECORDING MEDIUM

CROSS REFERENCE TO RELATED APPLICATION

This application is based upon and claims benefit of priority from the Japanese Patent Application No. 2008-293415, filed on Nov. 17, 2008, the entire contents of which are incorporated herein by reference.

BACKGROUND OF THE INVENTION

The present invention relates to a wireless terminal device, a communication method, and a computer-readable recording medium.

In 802.11, which is approved as a wireless LAN standard by IEEE, a physical layer and a MAC layer are defined. The MAC layer is a subset of a data link layer that is positioned above the physical layer in an IP-based network.

After its initial standardization, IEEE802.11 has undergone standardization of IEEE802.11b (a maximum of 11 Mbps) and IEEE802.11g (a maximum of 54 Mbps) which are high-speed wireless LANs that use 2.4 GHz band as well as IEEE802.11a (a maximum of 54 Mbps) which is a high-speed wireless LAN using 5 GHz band, and is now widely and generally available. In addition, standardization of IEEE802.11n for realizing a high throughput of 100 Mbps or higher is under consideration.

The network topology of IEEE802.11 is of two types: an ad-hoc network and an infrastructure network. An ad-hoc network is a network configuration that consists of two or more wireless terminal stations called stations (STA), which communicate with each other in a peer-to-peer manner.

On the other hand, an infrastructure network is a Basic Service Set (BSS) network that consists of a wireless base station called a wireless access point and one or more wireless terminal stations that connect to the wireless access point. Typically, the wireless access point is connected with a network. Thus, the wireless terminal stations can communicate with a communication device on the network via a wireless access point with which a connection relation has been established.

To have a wireless terminal station connected to a wireless access point, a user is required to make connection settings with the wireless access point and the wireless terminal station. For the wireless access point, a Service Set ID (SSID) of that access point and security information should be set. Here, the security information is an encryption method and secret information, may be a WEP key, for example. The SSID and security information of the wireless access point are also set on the wireless terminal station.

Because making such connection setting is difficult for "non-techie" users, some wireless access points have a SSID and security information already set at the time of sale and indicate the values thereof in their manual or on their housing.

Also, some wireless terminal stations receive a beacon transmitted from a wireless access point and display the SSID of the wireless access point, availability of security setting, received signal strength, connection condition and the like in the form of icons. When a number of wireless access points exist near a wireless terminal station of this type and the wireless terminal station receives beacons from those wireless access points, it displays icons corresponding to the respective wireless access points.

When the user selects an icon corresponding to an access point to which the user wants to connect from among displayed SSIDs, the wireless terminal starts establishment of connection with the wireless access point having that SSID and displays a wireless LAN setting screen as necessary. Connection setting is completed by the user inputting necessary information, such as security information (e.g., a WEP key), on the setting screen.

As described, wireless LAN systems are known that allow even users unfamiliar with computing techniques to easily make connection settings by preparing means for setting that are based on a Graphical User Interface (GUI) using icons.

In a wireless LAN system, a user may encounter a problem of becoming unable to perform communication on a wireless terminal station that was initially functioning normally. As this problem can result from various causes such as a failure of the wireless terminal station or a failure of the wireless access point, the user has to check various pieces of information to find out the cause of the problem. The cause of such a problem is tracked down in the following procedure, for example.

Step 1: check whether the wireless terminal station is receiving radiowave from the wireless access point. For example, it is checked whether an icon for the wireless access point to which connection should be established is being displayed on the wireless terminal station.

Step 2: check whether settings relating to a wireless LAN between the wireless terminal station and the wireless access point are correct. For example, it is checked whether connection can be established by clicking an icon.

Step 3: check IP-related settings of the wireless terminal station. For example, it is checked whether the IP address of a wireless interface has been set.

Step 4: check IP-related settings between the wireless terminal station and the wireless access point. For example, IP connectivity with the wireless access point is checked using Ping command or the like.

Step 5: check functions of the wireless access point relating to IP transfer and functions of individual applications on the wireless terminal station. For example, activate a Web browser to see whether a desired Web page can be displayed or activate mailing software to see whether mail transmission/reception is possible.

Through such tracking down, any step that is not normally functioning is detected. It shows that there is a problem at a point corresponding to such a step.

In addition to being performed by the user him/herself, such tracking down of the cause of a trouble as described above may be performed by the user calling a help desk for the wireless terminal station, wireless access point, or an Internet Service Provider (ISP) to find out the cause of the problem according to instructions from an operator there. The procedure of tracking down in this case is basically the same as the above-described one.

There are also known wireless communication devices that present a user with the cause of a failure based on information resulting from scanning of a wireless terminal station. For example, if a wireless communication device of this type does not receive a beacon including SSID that is set on the wireless terminal station, it estimates that "outside coverage area" is the cause of the failure (see JP-A 2006-33251 (KOKAI), for instance). A method has been also proposed that observes received signal strength from wireless access points in order to solve a connection failure of a wireless terminal station (see JP-A 2007-134748 (KOKAI), for instance).

As mentioned above, when there is a trouble associated with communication on a wireless terminal station, the user is required to identify the cause of the trouble by taking several steps. Steps of the procedure for identifying the cause include the necessity to check if a wireless access point to which connection should be established is displayed on the wireless terminal station or not, as described in step 1 above.

However, when a wireless LAN system is used in an apartment house, for example, a wireless access point may be installed by a resident of a neighboring room or a room below or above the user's room. In such a case, such wireless access points in neighborhood are displayed on the user's wireless terminal station in addition to the one installed by the user.

In such a case, the user needs to find the wireless access point the user has installed from a number of wireless access points displayed. A wireless access point has to be identified by a SSID that is set for each wireless access point, but the following problem can arise in this case.

To save users from making settings, wireless access points are sometimes sold with a SSID already set. That is to say, a SSID has been set by a wireless access point manufacture instead of being set by the user. In such a situation, when multiple wireless access points from the same manufacture are displayed on a wireless terminal station, the user cannot identify the one he/she installed.

Or even when the user sets a SSID by himself, the user may forget the SSID. The problem of being unable to identify a wireless access point also arises in that case as described above.

Or when a wireless access point installed by the user is in stealth mode, its SSID is not displayed on a wireless terminal station. Stealth mode refers to a mode in which a wireless access point transmits a beacon that does not indicate the SSID of the wireless access point.

Furthermore, when a configuration that installs a large number of wireless access points to secure a large area within which wireless terminal stations can make connection is adopted, such as in an office, it is impossible to identify which one of wireless access points displayed on a wireless terminal station represents a certain wireless access point.

Conventional wireless communication devices cannot solve such problems that arise when a SSID is not known as described above because they require presetting of a SSID on a wireless terminal station. Furthermore, in an environment in which a plurality of wireless access points are installed, it is impossible to identify from which wireless access point radiowave being observed by a wireless terminal station is physically transmitted.

SUMMARY OF THE INVENTION

According to one aspect of the present invention, there is provided a wireless terminal device, comprising:
a scan executing unit which performs first, second, and third scans in sequence to detect wireless base stations;
a wireless base station storing unit which stores base station information on the wireless base stations detected by the scan executing unit; and
a scan managing unit which sets a disappearance flag in base station information stored in the wireless base station storing unit that correspond to a wireless base station that was detected in the first scan but not in the second scan, sets a reappearance flag in base station information stored in the wireless base station storing unit that correspond to a wireless base station that was not detected in the second scan and was detected in the third scan, and identifies a wireless base station corresponding to base station information in which the disappearance flag and the reappearance flag are set.

According to one aspect of the present invention, there is provided a wireless terminal device, comprising:
a scan executing unit which performs first and second scans in sequence to detect wireless base stations;
a wireless base station storing unit which stores base station information on the wireless base stations detected by the scan executing unit; and
a scan managing unit which identifies a wireless base station that was detected in the first scan and not in the second scan or a wireless base station that was not detected in the first scan but was detected in the second scan.

According to one aspect of the present invention, there is provided a wireless terminal device, comprising:
a scan executing unit which performs first and second scans in sequence to detect wireless base stations;
a wireless base station storing unit which stores base station information on the wireless base stations detected by the scan executing unit; and
a scan managing unit which compares a timestamp included in base station information detected in the first scan with a timestamp included in base station information detected in the second scan, and identifies a wireless base station having a smaller timestamp.

BRIEF DESCRIPTION OF THE DRAWINGS

FIG. 3 is a diagram showing an example storage format of base station information in a wireless access point storing unit according to the embodiment;

FIG. 4 is a flowchart illustrating a wireless access point identification method according to the embodiment;

FIG. 5 is a diagram showing an example of an initial screen that is displayed on the wireless terminal device according to the embodiment;

FIG. 6 is a diagram showing an example of a result screen that is displayed on the wireless terminal device according to the embodiment;

FIG. 7 is a flowchart illustrating active scanning operations of the wireless terminal device according to the embodiment;

FIG. 11 is a diagram showing an example of a result screen that is displayed on the wireless terminal device according to the embodiment; and FIG. 12 is a diagram showing an example of a wireless LAN setting screen that is displayed on the wireless terminal device according to the embodiment.

DESCRIPTION OF THE EMBODIMENTS

Hereinafter, an embodiment of the present invention will be described with respect to drawings.

Figure 1:
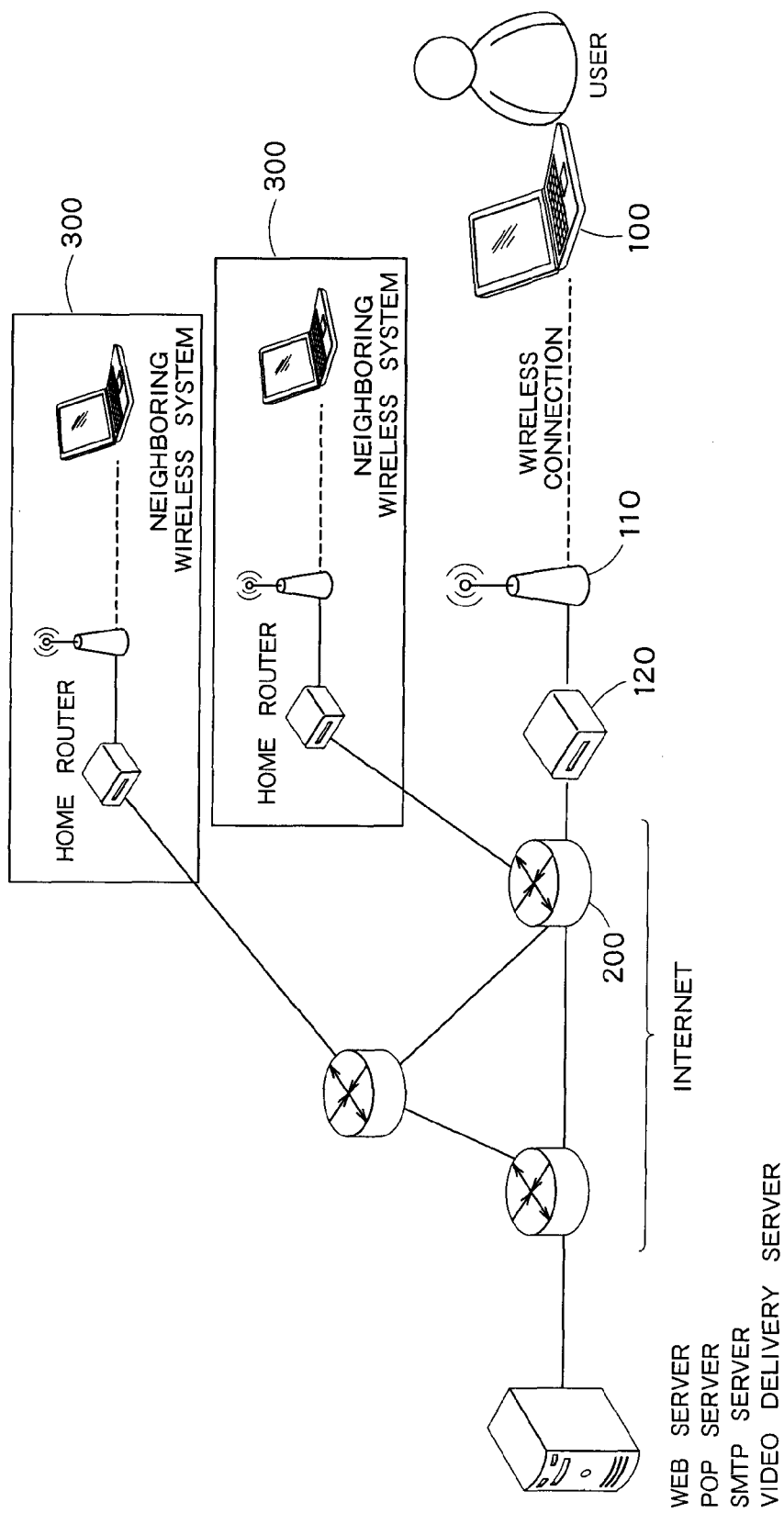
FIG. 1 is a diagram showing a configuration of a network that includes a wireless system according to an embodiment of the present invention.

FIG. 1 shows a configuration of a network that includes a wireless system according to an embodiment of the present invention. The wireless system has a wireless terminal device 100, a wireless access point (or wireless base station) 110, and a home router 120, and forms an infrastructure network. The wireless terminal device 100 and the wireless access point 110 are connected with each other by a wireless communication method, e.g., IEEE802.11g. The wireless access point 110 and the home router 120 are connected with each other via wired connection such as Ethernet (TM).

The home router 120 is connected to an internet composed of a plurality of routers 200 by an access line, such as ADSL or PON, for example. To the internet, nodes that communicate with the wireless terminal device 100, such as a WEB server, POP server, SMTP server, or video delivery server, are connected.

It is assumed that one or more neighboring wireless system 300 exist that include another wireless access point and another wireless terminal device in the vicinity of the wireless terminal device 100, e.g., a neighboring room or an opposite building.

The wireless terminal device 100 has scanning, authentication, and association functions for constituting an infrastructure network. The wireless access point 110 has beacon transmission, authentication, and association functions.

The beacon transmission function is the capability for the wireless access point 110 to periodically send information about a BSS network established by the wireless access point in beacon frames. The interval of beacons is typically set to on the order of 100 ms. Beacon information sent from the wireless access point 110 includes timestamp information, beacon interval information, capability information, SSID, Supported Rates, and Traffic Indication MAP (TIM).

Timestamp information is the value of a timer that keeps running after activation of the wireless access point 110. Beacon interval information indicates the interval of beacons. Capability information indicates information on whether Point Coordination Function (PCF) is performed or not and/or whether encryption is applied or not. SSID shows an identifier of an ESS or IBSS. Supported Rates represent a list of all wireless transmission rates that are supported. TIM indicates information about power management.

The scanning function is a function for the wireless terminal device 100 to detect the best beacon signal. As the types of scanning, passive scan and active scan are defined.

Passive scan is an essential function of IEEE802.11, with which the wireless terminal device 100 receives beacon signals while switching among available frequency channels. Then, from among beacon signals received, it selects a wireless access point that has transmitted a beacon signal carrying the same SSID information as the SSID preset on the wireless terminal device 100. When two or more wireless access points transmit beacons carrying the same SSID information, the wireless terminal device 100 selects one of them according to certain criterion of judgment. In general, the wireless terminal device 100 selects a wireless access point that provides the strongest power of received beacon signals, that is to say, one it can judge to have the best communication quality.

Active scan is basically equivalent to passive scan but it transmits search packets (probe request frames) for the wireless terminal device 100 to search for a wireless access point. A probe request frame contains SSID information that is set on the wireless terminal device 100, Supported Rates, capability information and so forth.

A wireless access point that has received the probe request frame and that has a matching SSID transmits a probe response frame which carries almost the same information as a beacon independently of beacon transmission timing. A probe response frame contains timestamp information, beacon interval information, capability information, SSID, Supported Rates and so forth.

Thus, the wireless terminal device 100 can recognize the presence of a wireless access point to which it can connect without waiting for a periodically transmitted beacon.

In an environment where a number of wireless access points are present that have a common SSID and use different frequency channels, such as an office, an appropriate wireless access point can be found in a shorter amount of time at the time of scanning by transmitting a probe request frame and, if no probe response frame is returned, changing to a different frequency channel to scan for another wireless access point, than waiting for a beacon that is periodically sent every time a wireless channel is changed.

Now, the authentication function will be described. After the wireless terminal device 100 selects an appropriate wireless access point, it makes an authentication request to that wireless access point. Types of authentication function include an authentication method called open system authentication and one called common key authentication.

Open system authentication is a method in which the wireless terminal device 100 transmits an authentication request frame (in open setting) to a wireless access point and the wireless access point performs only simple checking of SSID and the like to permit authentication. To permit authentication, the wireless access point transmits an authentication response frame (open) as a response signal to the authentication request frame. Upon receiving the authentication response frame, the wireless terminal device 100 determines that authentication is completed and carries out the association process discussed below.

On the other hand, a representative method of common key authentication is WEP method. The wireless terminal device 100 first transmits an authentication request frame (shared, 1) to a wireless access point. Upon receiving the frame, the wireless access point sends back an authentication response frame (shared, 2) with challenge text information attached as a response frame to the authentication request frame. The wireless terminal device 100 uses the challenge text information and security information set on itself (e.g., a WEP key) to encrypt the challenge text and transmits an authentication request frame (shared, 3) with the encrypted information attached.

The wireless access point decodes the encrypted challenge text attached to the received authentication request frame (shared, 3) using security information (e.g., a WEP key) set on the wireless access point, and compares the decoded challenge text with the challenge text it transmitted to the wireless terminal device 100.

When the two texts match as a result of the comparison, the wireless access point determines that its WEP key is the same as the WEP key of the wireless terminal device 100, that is, the wireless terminal device 100 is not an unauthorized wireless terminal device, and transmits an authentication response frame (shared, 4) with information indicative of authentication permission. Upon receiving the authentication response frame (shared, 4), the wireless terminal device determines that authentication process is completed and carries out the association process described below.

The association function will be now described. After authentication to the wireless access point is completed, the wireless terminal device 100 transmits an association request frame to the wireless access point. The association request frame has attached thereto information relating to the SSID and/or communication capability of the wireless terminal device 100. Upon receiving the association request frame, the wireless access point checks the SSID and/or communication capability to judge whether the wireless terminal device 100 is eligible to join the BSS network. If it judges that the wireless terminal device 100 is eligible, the wireless access point transmits an association response frame to the wireless terminal device 100.

When it receives the association response frame, the wireless terminal device 100 determines that it has been permitted to join the BSS network established by the wireless access point and thereafter starts communication with the wireless access point and/or other communication device on the network via the wireless access point.

Between the wireless terminal device 100 and the wireless access point 110, communication is established through the beacon transmission, scanning, authentication, association functions described above or the like. On the wireless terminal device 100, a wireless access point for the neighboring wireless system 300 is also displayed in addition to the wireless access point 110. The wireless terminal device 100 according to the present embodiment is capable of easily identifying the wireless access point 110 out of multiple wireless access points displayed, and its configuration and functions are shown below.

Figure 2:
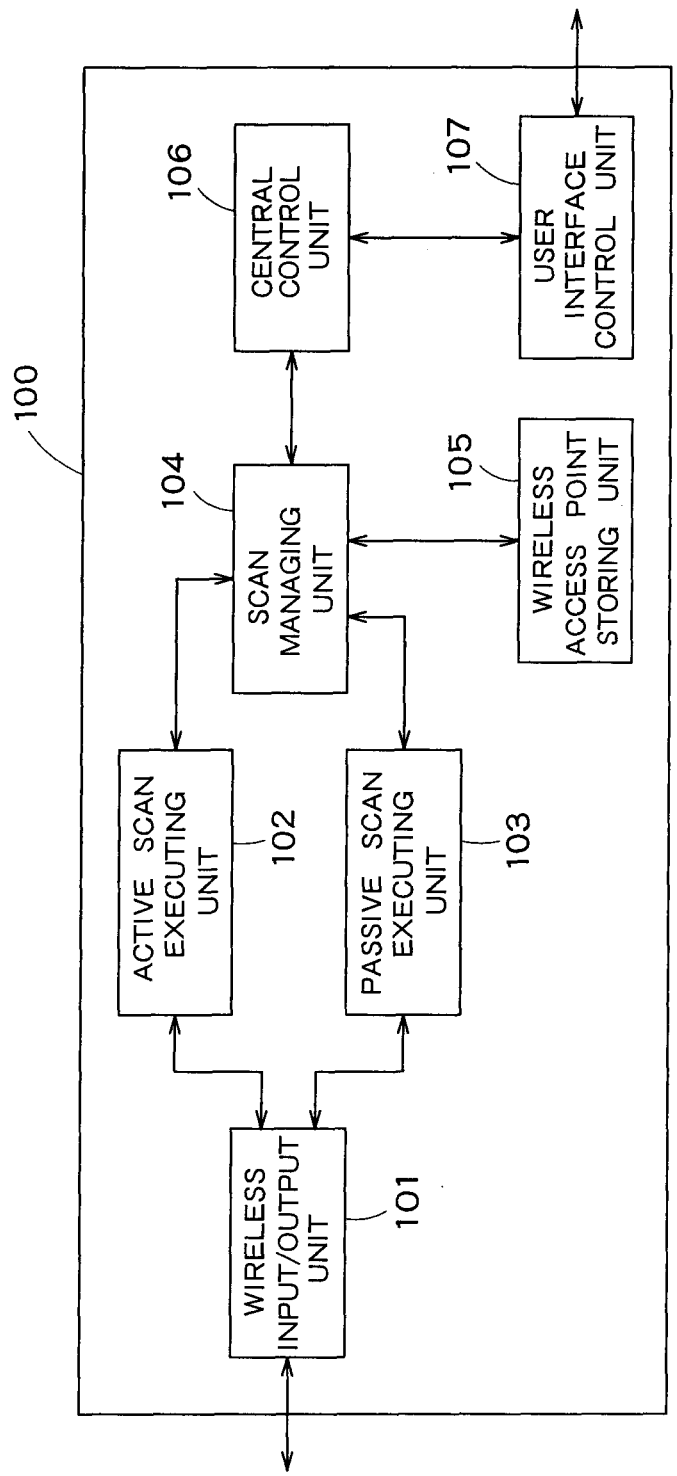
FIG. 2 is a diagram showing a configuration of a wireless terminal device according to the embodiment.

FIG. 2 shows a schematic configuration of the wireless terminal device 100. The wireless terminal device 100 has a wireless input/output unit 101, an active scan executing unit 102, a passive scan executing unit 103, a scan managing unit 104, a wireless access point storing unit 105, a central control unit 106, and a user interface control unit 107.

The wireless input/output unit 101 transmits wireless frames such as a probe request frame to the outside. The wireless input/output unit 101 also receives wireless frame such as beacons and probe response frame from the outside.

The active scan executing unit 102 receives a SSID value and a wireless channel (CH) from the scan managing unit 104, and transmits a probe request frame in which the SSID is indicated on the specified wireless channel via the wireless input/output unit 101. The active scan executing unit 102 also outputs information indicated in a probe response frame received via the wireless input/output unit 101 to the scan managing unit 104.

The passive scan executing unit 103 receives a beacon via the wireless input/output unit 101 on a wireless channel specified by the scan managing unit 104 and outputs information indicated in the beacon to the scan managing unit 104.

The scan managing unit 104 outputs "any" or a value read from the wireless access point storing unit 105 to the active scan executing unit 102 as the SSID value in accordance with instructions from the central control unit 106. The scan managing unit 104 also outputs information indicated in a probe response received from the active scan executing unit 102 to the wireless access point storing unit 105. The scan managing unit 104 also outputs information indicated in a beacon received from the passive scan executing unit 103 to the wireless access point storing unit 105.

The wireless access point storing unit 105 stores information received from the scan managing unit 104 in the format shown in FIG. 3, for example. In FIG. 3, pieces of information about each wireless access point are listed in one column. Beacon reception time is the time at which the latest beacon was received. Probe response reception time is the time at which the latest probe response was received and no value is described therein when no probe response has been received. Wireless access point information source indicates whether pieces of information from "timestamp" to "CH" in FIG. 3 are values indicated in a beacon or values indicated in a probe response. Wireless access point information lifetime represents the time limit up to which maintained information about a wireless access point is valid, and information about a wireless access point is discarded upon expiration of the time limit. In the example shown in FIG. 3, lifetime expires 10,000 milliseconds after recording of the latest wireless access point information.

Wireless access point disappearance flag assumes either one of values ON(1) or OFF(0) according to instructions from the scan managing unit 104. Wireless access point reappearance flag assumes either one of values ON(1) or OFF(0) according to instructions from the scan managing unit 104. Instructions from the scan managing unit 104 will be discussed later.

When the user interface control unit 107 has received an input event such as to a mouse, a keyboard or a touch screen from the user, it passes the event to the central control unit 106. The user interface control unit 107 also provides sound or light from a speaker, on a LED or a display according to instructions from the central control unit 106.

A method for identifying a wireless access point using the wireless terminal device 100 having such features is described using the flowchart illustrated in FIG. 4.

(Step S1) The central control unit 106 receives instructions for activation and execution of a wireless access point identification function via the user interface control unit 107. For example, activation may be ordered by opening an icon that represents the activation of the function with a mouse, touch screen, or keyboard associated with the wireless terminal device 100, and an initial screen such as the one shown in FIG. 5 is displayed. Then, execution is ordered by "Identify wireless access points" button being pressed.

"Neighboring wireless access point list" displays information on wireless access points that are obtained by the wireless terminal device 100 through active or passive scan. When "Update neighboring wireless access points" button is pressed, the wireless terminal device 100 carries out active or passive scanning to reacquire information on neighboring wireless access points and displays them in "Neighboring wireless access point list".

(Step S2) The central control unit 106 controls the scan managing unit 104 to carry out a first scan. The scan managing unit 104 outputs "any" to the active scan executing unit 102 as a SSID and the active scan executing unit 102 carries out active scanning. The scan managing unit 104 outputs information about wireless access points detected by the active scan to the wireless access point storing unit 105 for storage therein.

The first may also be passive scan.

Accordingly, at this step, scan executing means (the active scan executing unit 102 and passive scan executing unit 103) perform scan and output information (base station information) indicated in a probe response or a beacon received from a wireless access point to the scan managing unit 104. Then, the scan managing unit 104 outputs the base station information received from the scan executing means to the wireless access point storing unit 105 for storage therein.

(Step S3) The central control unit 106 outputs sound for requesting powering off of the wireless access point via the user interface control unit 107. In response, the user switches off the main body of the wireless access point which the user wants to have been identified.

(Step S4) The central control unit 106 controls the scan managing unit 104 to execute second scan. The scan managing unit 104 takes the SSIDs and CHs of wireless access points stored in the wireless access point storing unit 105 and outputs them to the active scan executing unit 102. The active scan executing unit 102 uses the SSIDs it received to execute active scan and outputs resulting base station information to the scan managing unit 104.

The scan managing unit 104 instructs the wireless access point storing unit 105 to turn or set ON the wireless access point disappearance flag in base station information that correspond to a wireless access point which was detected in the first scan and for which base station information is stored in the wireless access point storing unit 105 but which was not detected in the second scan.

The second scan may be active scan with SSID set to "any", or passive scan.

(Step S5) The central control unit 106 outputs sounds for requesting the user to power on the main body of the wireless access point via the user interface control unit 107. In response, the user powers the wireless access point which the user switched off at step S3.

(Step S6) The central control unit 106 controls the scan managing unit 104 to carry out third scan. The scan managing unit 104 takes the SSID and CH of any wireless access point whose wireless access point disappearance flag is ON from the wireless access point storing unit 105 and outputs them to the active scan executing unit 102. The active scan executing unit 102 uses the SSID it received to carry out active scan and outputs resulting base station information to the scan managing unit 104.

The scan managing unit 104 instructs the wireless access point storing unit 105 to turn on the wireless access point reappearance flag for any wireless access point for which the wireless access point disappearance flag is on but which was detected in the third scan.

The third scan may be active scan on wireless access points stored in the wireless access point storing unit 105, or active scan with SSID set to "any", or passive scan.

(Step S7) The central control unit 106 displays a result screen for wireless access point identification via the user interface control unit 107. At this point, the scan managing unit 104 identifies any wireless access point for which the wireless access point reappearance flag is on in the wireless access point storing unit 105 and notifies the central control unit 106 of such a wireless access point. The central control unit 106 has the wireless access point notified by the scan managing unit 104 displayed on a display unit (not shown) via the user interface control unit 107 as an access point that the user wants to have be identified.

FIG. 6 shows an example of the result screen. When "Connect" button is pressed by the user, establishment of a connection with the wireless access point is started. If the connection establishment requires setting information such as a WEP key or a password for executing IEEE802.1X, a screen for such setting is displayed.

When "Re-identify wireless access points" button is pressed by the user, the operations of identifying a wireless access point (steps S2 to S7) are performed again. When "Return to initial screen" button is pressed, the display screen returns to the initial screen such as shown in FIG. 5.

If no wireless access point is identified at step S7, information about a wireless access point and "Connect" button are not displayed. At this point, a message for indicating an error, e.g., "Identification failed", may be displayed.

Operations of the wireless terminal device 100 in a case where active scan with "any" indicated in the SSID is executed in the first to third scans in FIG. 4 will be described using the flowchart shown in FIG. 7.

(Step S11) Out of CHs (or wireless channels) available for the wireless input/output unit 101, select one that has not been used yet.

(Step S12) The active scan executing unit 102 uses the CH selected at step S11 to transmit a probe request with "any" indicated in SSID.

(Step S13) Wait for reception of a probe response for a predetermined time period. If SSID is "any", probe responses may be received from multiple wireless access points.

(Step S14) The active scan executing unit 102 outputs information indicated in a probe response received to the scan managing unit 104. The scan managing unit 104 outputs the information received from the active scan executing unit 102, the value of the disappearance wireless access point flag, and/or the value of reappearance wireless access point flag to the wireless access point storing unit 105.

(Step S15) It is determined whether all the CHs available for the wireless input/output unit 101 have been used for transmission of a probe request or not. If all the channels have been used, processing is terminated, and if not all the channels have been used, the flow returns to step S11.

Figure 8:
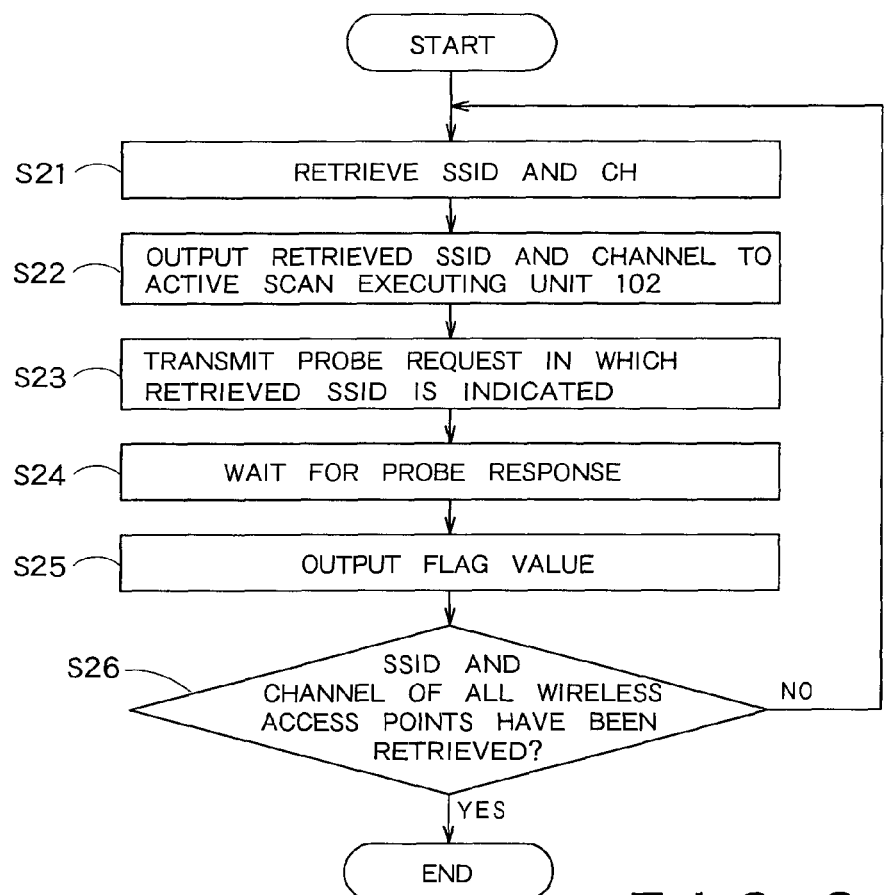
FIG. 8 is a flowchart illustrating active scanning operations of the wireless terminal device according to the embodiment.

Next, operations of the wireless terminal device 100 in a case where active scan is executed on wireless access points stored in the wireless access point storing unit 105 in the second or third scan in FIG. 4 will be described using the flowchart shown in FIG. 8.

(Step S21) The scan managing unit 104 retrieves a SSID and a CH corresponding to a wireless access point whose SSID and CH have not been read out yet from among wireless access points stored in the wireless access point storing unit 105.

(Step S22) The scan managing unit 104 outputs the SSID and CH retrieved at step S21 to the active scan executing unit 102.

(Step S23) The active scan executing unit 102 transmits a probe request in which the SSID received from the scan managing unit 104 is indicated on the CH received from the scan managing unit 104.

(Step S24) Reception of a probe response is waited for on the CH on which the probe request was transmitted at step S23.

(Step S25) The active scan executing unit 102 outputs information indicated in a received probe response to the scan managing unit 104. Based on the received information, the scan managing unit 104 outputs the values of the disappearance wireless access point flag and reappearance wireless access point flag to the wireless access point storing unit 105.

(Step S26) It is determined whether the scan managing unit 104 has read the SSIDs and CHs of all wireless access points stored in the wireless access point storing unit 105. If they have been read out for all the wireless access points, processing is terminated, and if not, the flow returns to step S21.

Figure 9:
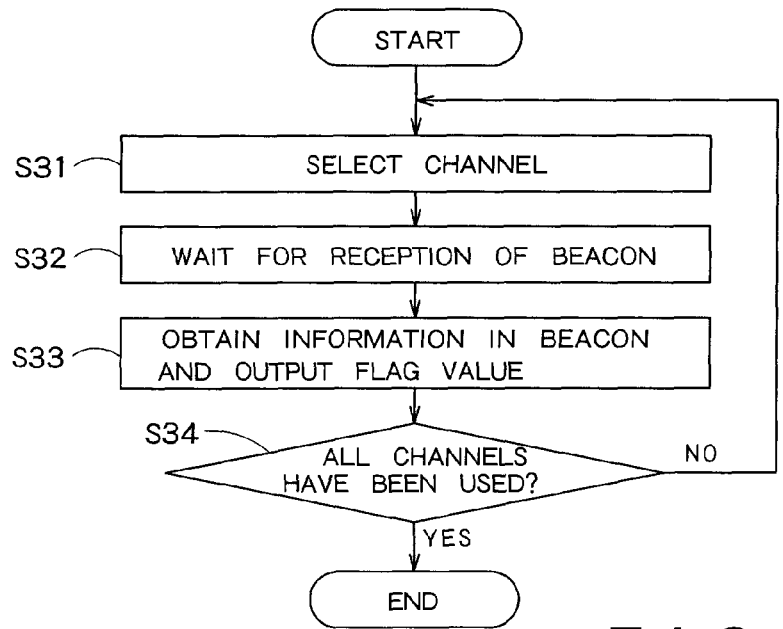
FIG. 9 is a flowchart illustrating passive scanning operations of the wireless terminal device according to the embodiment.

Next, operations of the wireless terminal device 100 in a case where passive scan is performed in the first to third scan in FIG. 4 will be described using the flowchart shown in FIG. 9.

(Step S31) From CHs (or wireless channels) available for the wireless input/output unit 101, select one that has not been used yet.

(Step S32) The passive scan executing unit 103 waits for reception of a beacon for a predetermined time period using the CH selected at step S31. Beacons can be received from a number of wireless access points.

(Step S33) The passive scan executing unit 103 outputs information indicated in a received beacon to the scan managing unit 104. The scan managing unit 104 outputs the information received from the active scan executing unit 102, the value of the disappearance wireless access point flag, and/or the value of the reappearance wireless access point flag to the wireless access point storing unit 105.

(Step S34) It is determined whether all the CHs available for the wireless input/output unit 101 have been used for receiving beacons or not. If all the channels have been used, processing is terminated, and if not all the channels have been used, the flow returns to step S31.

As described, in the present embodiment, the wireless terminal device 100 collects information about wireless access points and searches for a wireless access point that became undetectable due to switching off of a wireless access point which the user wants to identify and that became detectable as a result of switching on of the wireless access point which the user wants to identify. It thereby can easily identify a wireless access point that the user wants to identify from among a number of wireless access points.

Figure 10:
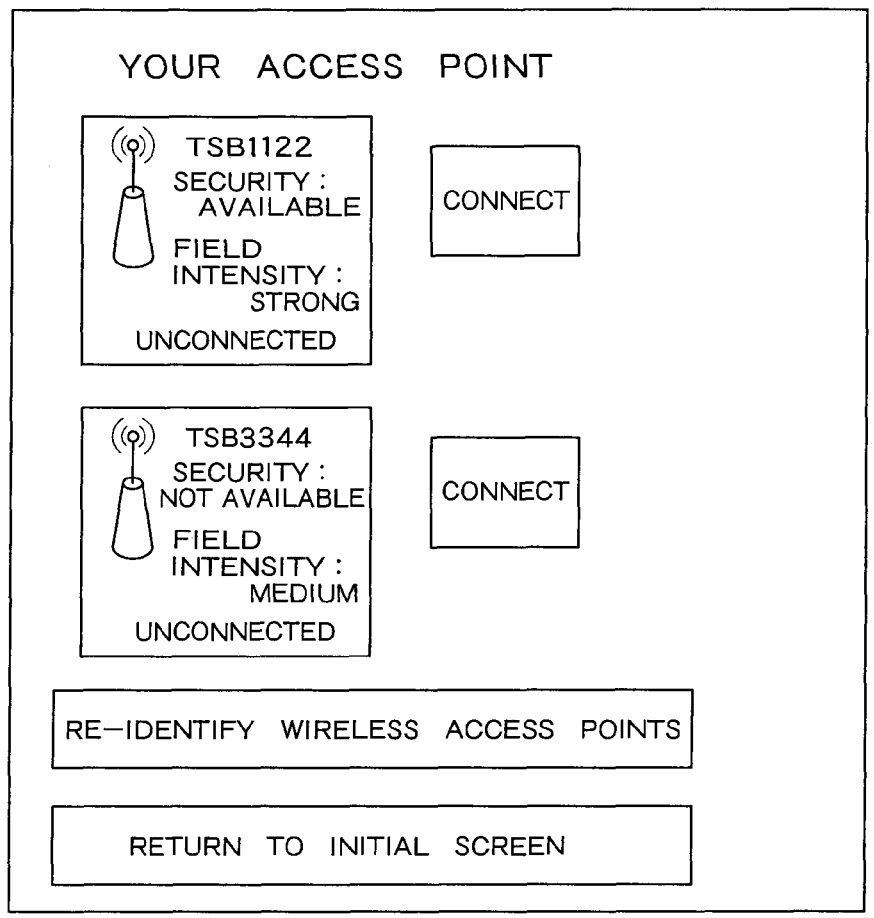
FIG. 10 is a diagram showing an example of a result screen that is displayed on the wireless terminal device according to the embodiment.

While the above-described embodiment illustrates the result screen shown in FIG. 6 as an example of a result screen, a result screen such as the one shown in FIG. 10 is displayed when a plurality of wireless access points have been identified through execution of steps S1 to S7. FIG. 10 shows a result screen with two wireless access points identified. The screen displays information on each of the two wireless access points as well as "Connect" buttons corresponding to them. When the "Connect" button is pressed, operations for establishing connection with the corresponding wireless access point are started.

FIG. 10 represents a case where two wireless access points are identified. When two or more wireless access points have been identified, wireless access points as many as identified are displayed in a similar manner. Here, when two or more wireless access points have been identified, it is possible that a nearby wireless access point happened to be turned on and off simultaneously with the wireless access point to be identified, thus a screen for prompting the user to carry out identification of wireless access points again may be displayed. Alternatively, identification of wireless access points may be carried out again without instructions from the user.

The sound produced for prompting the user to switch off a wireless access point in the above-described embodiment (step S3) may be simple beep sound or speech such as "Please switch off the wireless access point". It may also be something other than sound: the wireless terminal device 100 may vibrate or light may be used if the wireless terminal device 100 is provided with a light emitting device such as LED.

If the wireless terminal device 100 has a display, such a message may be displayed on the display. Furthermore, the wireless terminal device may notify that step S2 is completed on the display and initiate step S4 upon accepting an input from the user that indicates the user powered off the device.

If a manual or the like includes instruction to switch off the wireless access point within a predetermined time period (e.g., 10 seconds) after completion of step S2, the wireless terminal device 100 may not carry out step S3 and perform step S4 after waiting for the predetermined time period after completing step S2.

The sound produced for prompting the user to switch on a wireless access point in the above-described embodiment (step S5) may be simple beep sound or speech such as "Please switch on the wireless access point". It may also be something other than sound: the wireless terminal device 100 may vibrate or light may be used if the wireless terminal device 100 is provided with a light emitting device such as LED.

If the wireless terminal device 100 has a display, such a message may be displayed on the display. Furthermore, the wireless terminal device may notify that step S4 is completed on the display and initiate step S6 upon accepting an input from the user that indicates the user powered on the device.

If a manual or the like includes instruction to switch on the wireless access point within a predetermined time period (e.g., 60 seconds) after completion of step S4, the wireless terminal device 100 may not carry out step S5 and perform step S6 after waiting for the predetermined time period after completing step S4.

In the above-described embodiment, the first scan may be omitted if the wireless terminal device 100 periodically scans for neighboring access points.

It is also possible to utilize the characteristic of a timestamp value being cleared to zero when a wireless access point is powered on after being powered off. A timestamp value stored in the wireless access point storing unit 105 is compared with a timestamp value that is indicated in a beacon or a probe response obtained in the third scan, and if the timestamp value obtained in the third scan is smaller than the timestamp value stored in the wireless access point storing unit 105 and is smaller than a predetermined value, the wireless access point reappearance flag may be turned or set on. In this case, the second scan may be omitted. Also in this case, sound for requesting powering off of a wireless access point and sound for requesting powering on thereof may be combined into one sound for requesting powering off and on.

Alternatively, when a wireless access point has been powered off and on, the timestamp may be set based on the current time indicated by a clock in the wireless access point, for example, instead of being cleared to zero. In this case, a plurality of beacons or probe responses are received in the first scan and the amounts of increase in their timestamps per unit time are maintained in the wireless access point storing unit, and a timestamp value at the time of the third scan can be estimated according to the formula:

$$TS3' = X*(t3-t1) + TS1$$

where "TS3'" is the estimated timestamp value at the time of the third scan, "TS1" is the timestamp value obtained in the first scan, "X" is the amount of timestamp increase per unit time, "t3" is the time when the third scan is performed, and "t1" is the time when the first scan is performed.

When the timestamp value obtained from the third scan, TS3, is in the following relation, it can be determined that the wireless access point has been powered off and on:

$$\alpha < |TS3 - TS3'|$$

where "|x|" represents the absolute value of real value "x", and "α" is a value given in advance for preventing false judgment due to estimation errors.

In general, a wireless access point with which the user tries to set a wireless terminal device is often positioned in the vicinity of the wireless terminal device. In that case, it is expected that the wireless terminal device receives relatively strong radiowave from that wireless access point. Therefore, a condition that a beacon or a probe response has been received with signal strength greater than a predetermined value may be added to conditions for turning on the wireless access point disappearance and reappearance flags.

In the flowchart of FIG. 4, steps S5 and S6 may be omitted, and a wireless access point for which the wireless access point disappearance flag is on may be displayed on a result screen for wireless access point identification.

Also, steps S3 and S4 may be omitted in the flowchart of FIG. 4. In this case, the procedure of the flowchart in FIG. 4 is performed after the user switches off a wireless access point which the user wants to have identified. Then, for the scan at step S6, active scan with SSID set to "any" or passive scan is performed. The wireless access point reappearance flag is turned on when a wireless access point that is not stored in the wireless access point storing unit 105 is found. A wireless access point with the wireless access point reappearance flag on is the wireless access point the user wants to identify.

Some wireless access points simulate operations of multiple wireless access points with a single radio transceiver, which is called virtual wireless access point function. With the virtual wireless access point function, one wireless access point behaves as if a plurality of different wireless access points exist, such as by transmitting beacons with different SSID values.

However, because those wireless access points are physically a single entity, they stop operation simultaneously at the time of powering off and resume operation simultaneously at the time of powering on. Also, timestamp values indicated in beacons or probe responses are described according to a single clock possessed by the physical wireless access point. Therefore, in the flowchart of FIG. 4, the wireless access point disappearance and reappearance flags relating to virtual wireless access points that share a physical entity are turned on. This enables all the virtual wireless access points that share a physical entity to be displayed on a result screen of wireless access point identification.

When a virtual wireless access point is to be identified with a timestamp as described above, timestamp values indicated in beacons or probe responses from all the virtual wireless access points once return to zero, thus the virtual wireless access points can be identified just as general wireless access points.

Also, some wireless access points have a plurality of radio transceivers and realize wireless access point functions using the radios so as to be recognized as a plurality of wireless access points by a wireless terminal device. Such a wireless access point is called a multi-wireless access point. Because wireless access points share a power source as virtual wireless access points described above also in this case, behaviors at the time of powering off or on are the same as a general wireless access point. Thus, all wireless access points that share a physical entity can be identified just as virtual wireless access points.

Also, some wireless access points have stealth function. Stealth function is the capability not to populate a value in the SSID field of a beacon and not to respond to a probe response in which "any" is indicated in SSID, thereby disabling connection from a wireless terminal that is not aware of the SSID of the wireless access points.

In this case, if a SSID is preset on a wireless terminal device, the wireless terminal device can identify a wireless access point as described above. However, when a SSID is not set on the wireless terminal device, modification to the procedure is required as follows.

In the flowchart of FIG. 4, scans at steps S2, S4 and S6 are desirably passive scan. In addition, in processing in the flowchart, a BSSID is desirably used for identification of a wireless access point instead of a SSID.

FIG. 11 shows an example screen of wireless access point identification results. In FIG. 11, a BSSID is displayed as the identifier of a wireless access point, instead of a SSID. Also, it is also indicated that the wireless access point uses the stealth function.

However, if the SSID of the identified wireless access point is preset on the wireless terminal device, it is desirable to transmit a probe response in which the SSID of the wireless access point is indicated and, after it is verified that the wireless access points has that SSID such as by checking whether a response to the probe response is sent back, to display also the SSID on the result screen for wireless access point identification.

When "Connect" button in FIG. 11 is pressed, a wireless LAN setting screen shown in FIG. 12 appears. On the wireless LAN setting screen, it is desirable to permit setting of necessary information for connecting to a wireless access point. In FIG. 12, SSID is displayed as an item for setting on the assumption that the SSID of the identified wireless access point is not set on the wireless terminal device. If a correct SSID is set on the wireless terminal device in advance, the setting screen may be displayed with the value already entered in the SSID setting field.

Some wireless terminal devices have what is called a combo radio. It enables use of a different wireless method, such as IEEE802.11a, in addition to IEEE802.11g, for example, and has a constraint that multiple wireless methods cannot be used at a time. In this case, such a wireless terminal device can be easily handled by performing scan with the CH changed for all wireless methods supported at the time of the first, second, or third scan in FIG. 4.

Some wireless terminal devices have what is called a multi-radio. Such a wireless terminal device has a number of radios for different wireless methods, such as IEEE802.11a, in addition to IEEE802.11g, for example, and can use a number of wireless methods at a time. In this case, the first, second, or third scan of FIG. 4 can be performed simultaneously for each of the wireless methods, which can efficiently perform the procedure of wireless access point identification.

If passive scan is performed as the second and/or third scan in the embodiment described above, it is preferable to maintain the intervals of beacons from wireless access points, calculate the longest beacon interval for each wireless channel, and listen to wireless channels only for the time period of the longest beacon interval.

While the description above illustrates a case where the user activates the wireless access point identification function, the function may also be activated in other ways. For example, a wireless access point setting wizard may execute the wireless access point identification function.

While the wireless terminal device 100 is illustrated in FIG. 1 like a PC, it may also be a PDA, mobile phone, or the like.

At least part of the wireless terminal device 100 described in the above embodiments may be implemented in either hardware or software. When implemented in software, a program that realizes at least part of functions of the wireless terminal device 100 may be stored on a recording medium such as a flexible disk or CD-ROM and read and executed by a computer. The recording medium is not limited to a removable recording medium such as a magnetic disk or optical disk, but may be a non-removable recording medium such as a hard disk device or memory.

The program that realizes at least part of the functions of the wireless terminal device 100 may be distributed through a communication line (including wireless communications) such as the Internet. Further, the program may be encrypted, modulated, or compressed to be distributed through a wired line or wireless line such as the Internet or to be distributed by storing the program on a recording medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless terminal device, comprising:
   a scan executing unit which performs first, second, and third scans in sequence to detect wireless base stations;

a wireless base station storing unit which stores base station information on the wireless base stations detected by the scan executing unit; and a scan managing unit which sets a first flag in base station information stored in the wireless base station storing unit that correspond to a wireless base station that was detected in the first scan but not in the second scan, sets a second flag in base station information stored in the wireless base station storing unit that correspond to a wireless base station that was not detected in the second scan and was detected in the third scan, and identifies a wireless base station corresponding to base station information in which the first flag and the second flag are set.

2. The device according to claim 1, further comprising:
a display unit; and
a control unit which controls the display unit, wherein
the control unit acquires base station information for the wireless base station identified by the scan managing unit from the wireless base station storing unit and has the base station information be displayed on the display unit.

3. The device according to claim 2, wherein
the display unit emits sound or light, and
the control unit controls the display unit to emit sound or light after the first scan and after the second scan by the scan executing unit.

4. The device according to claim 1, wherein, in the second scan or the third scan, the scan executing unit scans only a wireless channel used by the wireless base station detected in the first scan.

5. The device according to claim 1, wherein, in the third scan, the scan executing unit scans only a wireless channel used by a wireless base station for which the first flag is set.

6. The device according to claim 1, wherein
the scan executing unit performs passive scan, and
the scan managing unit uses a basic service set ID (BSSID) included in the base station information to determine whether or not a wireless base station was detected in the first scan and not in the second scan and whether or not the wireless base station was not detected in the second scan and was detected in the third scan.

7. A wireless terminal device, comprising:
a scan executing unit which performs first and second scans in sequence to detect wireless base stations;
a wireless base station storing unit which stores base station information on the wireless base stations detected by the scan executing unit; and
a scan managing unit which compares a timestamp included in base station information detected in the first scan with a timestamp included in base station information detected in the second scan, and identifies a wireless base station having a smaller timestamp.

8. The device according to claim 7, wherein the scan managing unit identifies a wireless base station for which a timestamp included in base station information detected in the second scan is outside an estimated range that is based on a timestamp included in base station information detected in the first scan and a time interval between the second scans.

9. The device according to claim 7, further comprising:
a display unit; and
a control unit which controls the display unit, wherein
the control unit acquires base station information for the wireless base station identified by the scan managing unit from the wireless base station storing unit and has the base station information be displayed on the display unit.

10. The device according to claim 9, wherein
the display unit emits sound or light, and
the control unit controls the display unit to emit sound or light after the scan executing unit performs the first scan.

11. A communication method, comprising:
performing a first scan to detect wireless base stations;
storing base station information on the wireless base stations detected in the first scan in a wireless base station storing unit;
performing a second scan to detect a wireless base station;
setting a first flag in base station information stored in the wireless base station storing unit that corresponds to a wireless base station that was detected in the first scan and was not in the second scan;
performing a third scan to detect a wireless base station;
setting a second flag in base station information stored in the wireless base station storing unit that corresponds to a wireless base station that was not detected in the second scan and was detected in the third scan; and
identifying a wireless base station corresponding to base station information in which the first flag and the second flag are set.

12. A non-transitory computer-readable recording medium having recorded therein a communication program which causes a computer to execute:
a step of performing a first scan to detect wireless base stations;
a step of storing base station information on the wireless base stations detected in the first scan in a wireless base station storing unit;
a step of performing a second scan to detect a wireless base station;
a step of setting a first flag in base station information stored in the wireless base station storing unit that corresponds to a wireless base station that was detected in the first scan and was not detected in the second scan;
a step of performing a third scan to detect a wireless base station;
a step of setting a second flag in base station information stored in the wireless base station storing unit that corresponds to a wireless base station that was not detected in the second scan and was detected in the third scan; and
a step of identifying a wireless base station corresponding to base station information in which the first flag and the second flag are set.

* * * * *